(12) United States Patent
Musselman

(10) Patent No.: US 7,918,475 B2
(45) Date of Patent: Apr. 5, 2011

(54) QUICK DISCONNECT HITCH

(75) Inventor: Thomas A Musselman, Plymouth, MI (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 104 days.

(21) Appl. No.: 12/496,815

(22) Filed: Jul. 2, 2009

(65) Prior Publication Data

US 2011/0001302 A1    Jan. 6, 2011

(51) Int. Cl.
*B60D 1/60* (2006.01)
(52) U.S. Cl. ................................................... 280/491.5
(58) Field of Classification Search ............... 280/491.5, 280/495, 504
See application file for complete search history.

(56) References Cited

U.S. PATENT DOCUMENTS

| | | | | |
|---|---|---|---|---|
| 3,981,517 A | * | 9/1976 | Crochet, Sr. | 280/478.1 |
| 4,312,516 A | * | 1/1982 | Olsen | 280/406.2 |
| 4,811,967 A | * | 3/1989 | Hensley | 280/479.3 |
| 4,962,945 A | | 10/1990 | Vannoy | |
| 5,713,691 A | | 2/1998 | Solberg | |
| 5,730,456 A | * | 3/1998 | Bowers | 280/507 |
| 6,068,281 A | * | 5/2000 | Szczypski | 280/479.2 |
| 6,598,897 B1 | * | 7/2003 | Patti | 280/507 |
| 6,601,867 B2 | | 8/2003 | Carty | |
| 6,616,168 B2 | * | 9/2003 | Belinky | 280/511 |
| 6,851,698 B2 | | 2/2005 | Ingles | |
| 7,364,180 B2 | * | 4/2008 | Hensley | 280/455.1 |

* cited by examiner

*Primary Examiner* — Kevin Hurley
(74) *Attorney, Agent, or Firm* — Jeffrey P. Calfa; Mark C. Bach

(57) ABSTRACT

Embodiments described herein relate to methods and structures that can be used to quickly disconnect a trailer from a tractor. One embodiment provides a quick disconnect hitch that links a tractor and a trailer. The quick disconnect hitch comprises a tongue attached to the tractor and a body insertable into the tongue. An extension is attached to and projects away from the body. The extension is connectable with the trailer. A pair of lugs is disposed on the body. The lugs are movable between a connected position where the trailer moves responsive to movement of the tractor and a disconnected position where the trailer moves independently of the tractor. A detent is disposed on each of the pair of lugs. A pair of slots is disposed on the tongue. Each of the pair of slots is configured to accept the detent. Each detent is disposed in each of the pair of slots when the lugs are in the connected position, and each detent is dislocated from each of the pair of slots when the lugs are in the disconnected position.

2 Claims, 2 Drawing Sheets

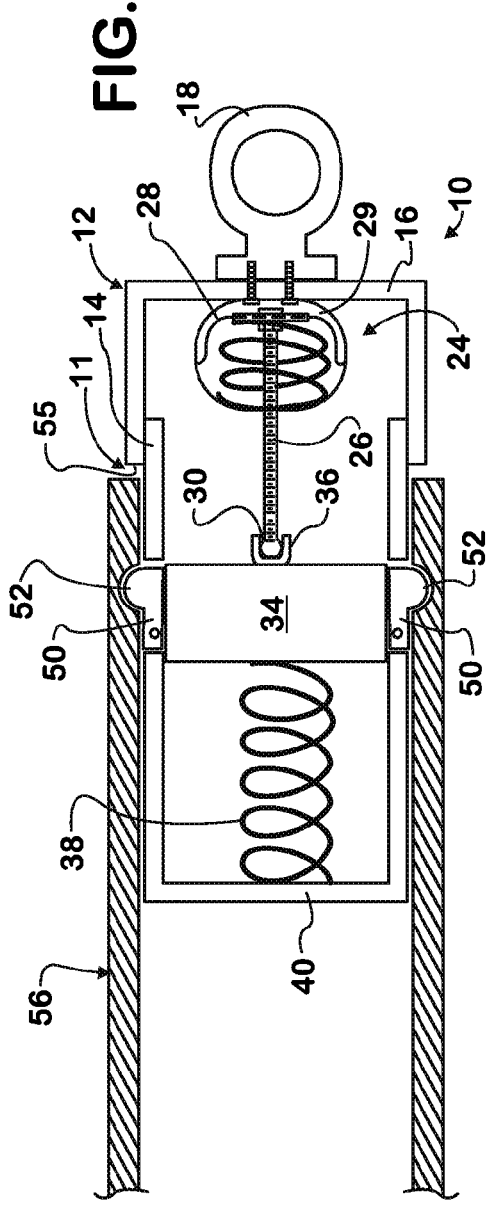
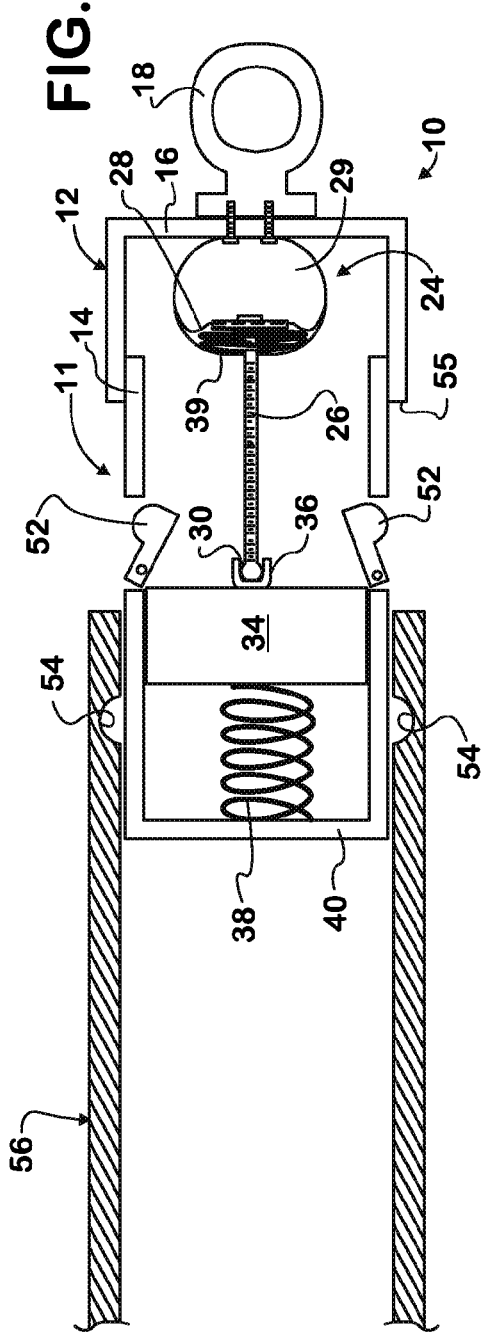

QUICK DISCONNECT HITCH

BACKGROUND

From time to time, it may be desirable to remove a portion of a vehicle. For example, it may be desirable to remove a trailer, e.g. if the trailer becomes damaged, from a tractor or prime mover moving the trailer. Such a time may occur in a combat situation or another other situation. Once the trailer is removed from the tractor, the tractor may continue without the trailer. It may be advantageous to remove the trailer quickly without stopping movement of the tractor.

SUMMARY

Embodiments described herein relate to methods and structures that can be used to quickly disconnect a trailer from a tractor. One embodiment provides a quick disconnect hitch that links a tractor and a trailer. The quick disconnect hitch comprises a tongue attached to the tractor and a body insertable into the tongue. An extension is attached to and projects away from the body. The extension is connectable with the trailer. A pair of lugs is disposed on the body. The lugs are movable between a connected position where the trailer moves responsive to movement of the tractor and a disconnected position where the trailer moves independently of the tractor. A detent is disposed on each of the pair of lugs. A pair of slots is disposed on the tongue. Each of the pair of slots is configured to accept the detent. Each detent is disposed in each of the pair of slots when the lugs are in the connected position, and each detent is dislocated from each of the pair of slots when the lugs are in the disconnected position.

BRIEF DESCRIPTION OF THE DRAWINGS

FIG. 1 is a partially sectioned view of an embodiment of a quick disconnect hitch described herein in a connected position;

FIG. 2 is partially sectioned view of an embodiment of quick disconnect hitch described herein in a disconnected position.

DETAILED DESCRIPTION

Figure 3:
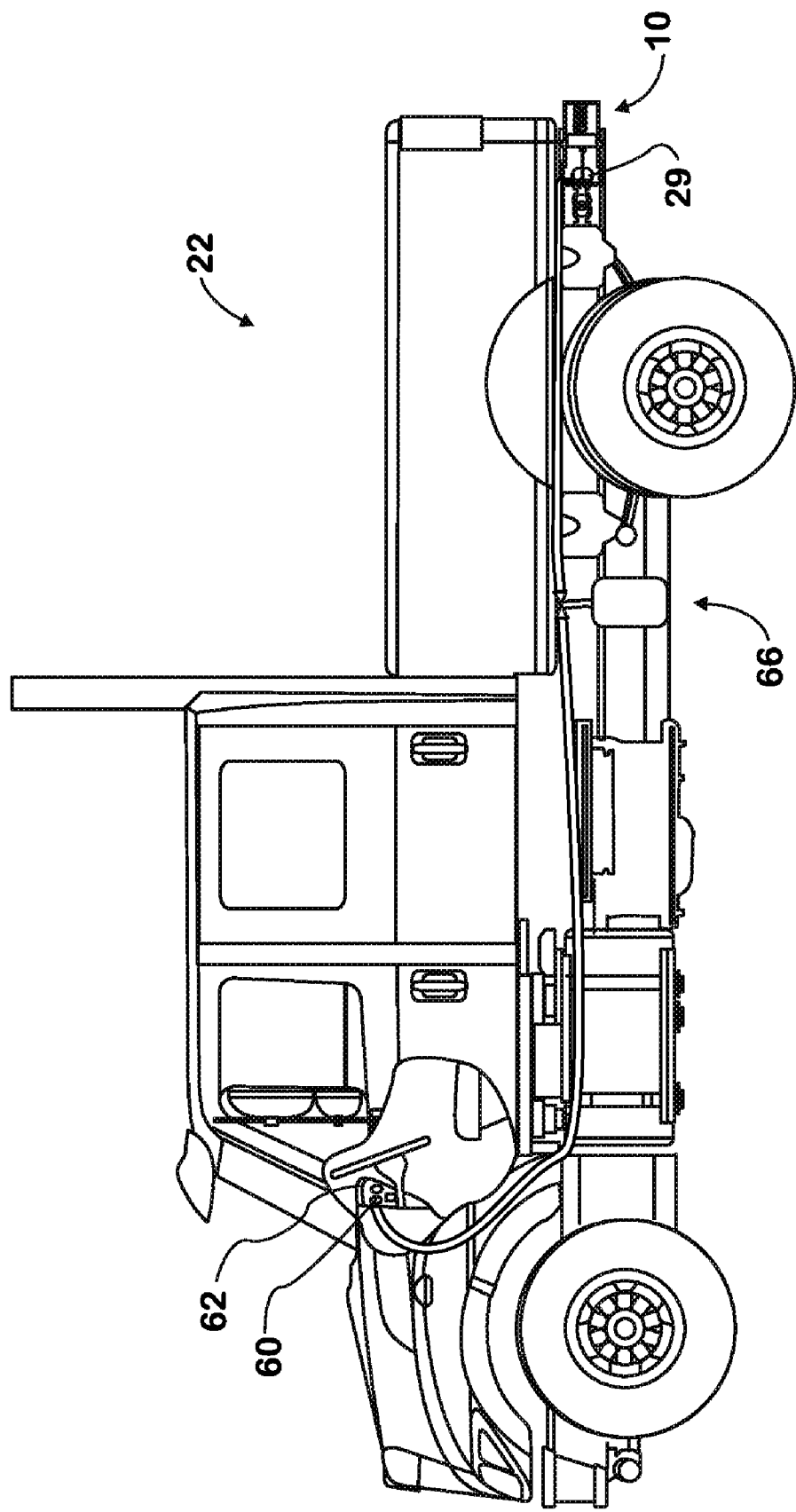
FIG. 3 is an elevational view of a vehicle including an embodiment of a quick disconnect hitch described herein.

Embodiments described herein generally provide methods and structures that facilitate quick removal of a portion of a vehicle. More specifically, embodiments described herein provide methods and structures that facilitate quick removal of a trailer from a tractor. In one embodiment described herein, the methods and structures include a quick disconnect hitch 10 that links the tractor and the trailer. The quick disconnect hitch 10 is movable between a connected position where the trailer moves responsive to movement of the tractor, and a disconnected position where the trailer moves independently of the tractor. In the illustrated embodiments, the quick disconnect hitch 10 is activated through use of an air reservoir and an associated air system of an air suspension of the tractor to provide pressurized air. The quick disconnect hitch 10 provides means for quickly removing a trailer from a tractor when the quick disconnect hitch 10 is in its disconnected position while reliably maintaining connection between the tractor and the trailer when the quick disconnect hitch 10 is in its connected position.

Referring to FIG. 1, one embodiment of the quick disconnect hitch 10 is shown. The quick disconnect hitch 10 includes a body 11 having a cap 12 at a first end 14 of the body 11. A second end 16 is disposed opposite to the first end 14 on the body 11. An extension 18 is attached to and projects away from the second end 16. The extension 18 may be used to connect the quick disconnect hitch 10 to a hitch pin (not shown for clarity) of a trailer.

A pneumatic apparatus 24 is located within the body 11 and is operable to move the quick disconnect hitch 10 between the connected position and the disconnected position. In one embodiment, the pneumatic apparatus 24 comprises a push rod 26 engaged to a movable diaphragm 28 of an air chamber 29. A second end 30 of the push rod 26 is attached to a movable block 34 within the body 11 by a clevis 36. When the quick release hitch 10 is in its connected position, the block 34 is forced towards the position shown in FIG. 1 through action of a spring 38 that is disposed between the block 34 and an end wall 40 of the body 11, and a spring 39 that is disposed against the diaphragm 28. The end wall 40 is opposite to the cap 12. The spring 38 decreases the likelihood that the quick disconnect hitch 10 will move toward the disconnected position unintentionally.

When in the position shown in FIG. 1, the block 34 engages against a pair of movable lugs 50. The lugs 50 are located on opposite sides of the block 34. Each lug 50 incorporates a detent 52. Each detent 52 is engageable with a slot 54 provided in a tongue 56 that is attached to the tractor 22. Each slot 54 is configured to accept a detent 52. The lugs 50 are movable or pivotable between a connected position where the detents 52 are disposed in the slots 54 and the trailer moves responsive to movement of the tractor 22, and a disconnected position where the detents 52 are dislocated from the slots and the trailer moves independently of the tractor 22. In some embodiments, the lugs 50 may be biased, such as by a spring and the like, to position the detents 52 in the slots 54 as shown in FIG. 1. In one embodiment, the tongue 56 is substantially hollow and slides over a portion of the body 11 extending from the second end wall 40 until the tongue 56 abuts an end edge 55 of end cap 12. In this manner, the end edge 54 acts as a stop member and ensures intended engagement between the slots 54 and the detents 52. When such intended engagement between the slots 54 and the detents 52 occurs, the quick disconnect hitch 10 is disposed in the connected position, and the trailer moves responsive to movement of the tractor 22.

With construction of embodiments of the quick disconnect hitch 10 being disclosed, methods of operation of the quick disconnect hitch 10 will be discussed. Steps comprising the methods may be performed in any appropriate order. Also, steps of one method may be combined with steps of another method to arrive at yet additional methods.

With the quick disconnect hitch 10 in the connected position, as shown in FIG. 3, the trailer (not shown for clarity) moves responsive to movement of the tractor 22. When it is desirable to remove the trailer from the tractor 22 and render movement of the trailer independent of movement of the tractor 22, the quick disconnect hitch 10 can be moved from the connected position of FIG. 1 to the disconnected position of FIG. 2. An operator of the tractor 22 can activate an appropriate device, such as a switch 60 located on a dashboard 62 of the tractor 22 or other suitable location. Upon activation of the switch 60, pressurized air, such as air from a suspension system 66 of the tractor 22, is sent into the air chamber 29 of the pneumatic apparatus 24. The pressurized air causes the diaphragm 28 to move toward the second end 40 of the body 11. Movement of the diaphragm 28 toward the second end 40 causes the push rod 26 attached to the diaphragm 28 to move the block 34 toward the end wall 40. As the block 34 moves toward the end wall 40, the lugs 50 are free to move laterally toward the push rod 26, as shown in FIG. 2. As the block 34 moves against biasing spring 22 the lugs 50 move, separating each detent 52 from each slot 54, respectively. Once the lugs 50 are moved sufficiently away from the slots 54, the quick disconnect hitch 10 is in its disconnected position. Once the quick disconnect hitch 10 is in its disconnected position, the tongue 56 can be moved with respect to the body 11. Relative movement of the body 11 and the tongue 56 permits independent movement of the trailer and the tractor 22.

When the quick disconnect hitch 10 is in its disconnected position, the tractor 22 and the trailer move independently. When it is desired to move the trailer responsive to movement of the tractor 10, the quick disconnect hitch 10 can be moved from its disconnected position (FIG. 2) to its connected position (FIG. 1). The tractor 22 and the trailer are appropriately positioned to suitably align the body 11 and the tongue 56. A suitable mechanism, such as the switch 60 or the like, is activated so that air pressure is removed from the air chamber 29. The spring 38 moves the block 34 away from the end wall 40. Once the block 34 moves sufficiently away from the end wall 40, the detents 52 move into the slots 54 such that the quick disconnect hitch 10 is in its connected position. With the detents 52 engaged with the slots 54, the trailer moves responsive to movement of the tractor 22.

What is claimed is:

1. A quick disconnect hitch that links a tractor and a trailer, the quick disconnect hitch comprising:
   a tongue attached to the tractor;
   a body insertable into the tongue;
   an extension attached to and projecting away from the body, the extension being connectable with the trailer;
   a pair of lugs disposed on the body, the lugs being movable between a connected position where the trailer moves responsive to movement of the tractor and a disconnected position where the trailer moves independently of the tractor;
   a detent disposed on each of the pair of lugs;
   a pair of slots disposed on the tongue, each of the pair of slots being configured to accept the detent, each detent being disposed in each of the pair of slots when the lugs are in the connected position and each detent being dislocated from each of the pair of slots when the lugs are in the disconnected position; and
   a pneumatic apparatus located in the body, the pneumatic apparatus being operable to move the quick disconnect hitch between the connected position and the disconnected position.

2. The quick disconnect hitch as defined in claim 1 further comprising:
   a block movably disposed within the body between the connected position where the block engages against the pair of lugs so that each detent is disposed in each of the pair of slots, and the disconnected position where the block is offset from the pair of lugs so that each detent is dislocated from each of the pair of slots; and
   a spring disposed between the block and an end of the body, the spring forcing the block towards the connected position.

* * * * *